(12) United States Patent
Chakam et al.

(10) Patent No.: US 9,524,602 B2
(45) Date of Patent: Dec. 20, 2016

(54) COMPACT ANTENNA STRUCTURE WITH A COUPLING DEVICE

(71) Applicant: CONTINENTAL AUTOMOTIVE GMBH, Hannover (DE)

(72) Inventors: Guy-Aymar Chakam, Regensburg (DE); Martin Weinberger, Munich (DE)

(73) Assignee: CONTINENTAL AUTOMOTIVE GMBH, Hanover (DE)

( * ) Notice: Subject to any disclaimer, the term of this patent is extended or adjusted under 35 U.S.C. 154(b) by 129 days.

(21) Appl. No.: 14/369,950

(22) PCT Filed: Dec. 19, 2012

(86) PCT No.: PCT/EP2012/076129
§ 371 (c)(1),
(2) Date: Sep. 18, 2014

(87) PCT Pub. No.: WO2013/098151
PCT Pub. Date: Jul. 4, 2013

(65) Prior Publication Data
US 2015/0042452 A1    Feb. 12, 2015

(30) Foreign Application Priority Data

Dec. 29, 2011   (DE) .................. 10 2011 090 139

(51) Int. Cl.
*G08B 21/00*    (2006.01)
*G07C 9/00*    (2006.01)
(Continued)

(52) U.S. Cl.
CPC ....... *G07C 9/00944* (2013.01); *G07C 9/00007* (2013.01); *H01Q 1/3241* (2013.01);
(Continued)

(58) Field of Classification Search
CPC ................. G07C 2009/00769; G07C 9/00007; G07C 9/00944; H04B 1/03; H01Q 9/26
USPC ......................................................... 340/5.64
See application file for complete search history.

(56) References Cited

U.S. PATENT DOCUMENTS

| | | | |
|---|---|---|---|
| 4,764,773 A | 8/1988 | Larsen et al. | .................. 343/713 |
| 5,668,565 A | * 9/1997 | Robinson | ............... H01Q 1/085 333/34 |

(Continued)

FOREIGN PATENT DOCUMENTS

| | | | | |
|---|---|---|---|---|
| DE | 3689376 T2 | 4/1994 | ............... H01Q 1/12 |
| DE | 202005015708 U1 | 12/2005 | ............. H01Q 21/26 |

(Continued)

OTHER PUBLICATIONS

International Search Report and Written Opinion, Application No. PCT/EP2012/076129, 18 pages, Mar. 14, 2013.

(Continued)

*Primary Examiner* — Mark Rushing
(74) *Attorney, Agent, or Firm* — Slayden Grubert Beard PLLC

(57) ABSTRACT

A transmission arrangement for a radio station of an access system may include a printed circuit board with an upper main surface and a first metallization plane in which conducting paths are formed. A drive circuit for supplying a frequency signal and an antenna structure are also provided. The antenna structure includes a coupling device, a conductor structure and a continuous, electrically conductive path having first and second ends opposite each other. The coupling device is configured to couple a frequency signal supplied by the drive circuit into the conductor structure. The first and/or second ends form end(s) of the conductor (Continued)

structure. The printed circuit board is retained at a distance from the first and/or second end by a gas or an electrically non-conductive material.

18 Claims, 2 Drawing Sheets

(51) Int. Cl.
    *H01Q 1/32*     (2006.01)
    *H01Q 9/26*     (2006.01)
    *H04B 1/03*     (2006.01)

(52) U.S. Cl.
    CPC ............... *H01Q 9/26* (2013.01); *H04B 1/03* (2013.01); *G07C 2009/00769* (2013.01)

(56) References Cited

U.S. PATENT DOCUMENTS

| | | | |
|---|---|---|---|
| 6,600,451 B2 | 7/2003 | Mimura et al. | 343/741 |
| 7,579,999 B2 | 8/2009 | Boβ et al. | 343/799 |
| 7,804,451 B2 * | 9/2010 | Glocker | H01Q 1/243 |
| | | | 343/702 |
| 8,284,111 B2 | 10/2012 | Chakam et al. | 343/742 |
| 2009/0122847 A1 * | 5/2009 | Nysen | H01Q 1/38 |
| | | | 375/222 |
| 2010/0277376 A1 | 11/2010 | Chakam et al. | 343/702 |
| 2011/0001675 A1 | 1/2011 | Lee | 343/729 |

FOREIGN PATENT DOCUMENTS

| | | | | |
|---|---|---|---|---|
| DE | 60113788 T2 | 8/2006 | | H01P 7/08 |
| DE | 102007037614 A1 | 2/2009 | | H01Q 1/32 |
| DE | 102007061305 A1 | 6/2009 | | B60R 25/00 |
| DE | 102008027246 A1 | 12/2009 | | G06K 19/077 |
| EP | 2120289 A1 | 11/2009 | | H01Q 1/32 |
| WO | 2009/030041 A1 | 3/2009 | | H01Q 1/36 |
| WO | 2013/098151 A1 | 7/2013 | | H01Q 1/32 |

OTHER PUBLICATIONS

German Office Action, Application No. 102011090139.6, 10 pages, Apr. 19, 2016.

* cited by examiner

COMPACT ANTENNA STRUCTURE WITH A COUPLING DEVICE

CROSS-REFERENCE TO RELATED APPLICATIONS

This application is a U.S. National Stage Application of International Application No. PCT/EP2012/076129 filed Dec. 19, 2012, which designates the United States of America, and claims priority to DE Application No. 10 2011 090 139.6 filed Dec. 29, 2011, the contents of which are hereby incorporated by reference in their entirety.

TECHNICAL FIELD

The invention relates to a transmission arrangement for a radio station for an access system, e.g. for a portable radio key, such as is typically used for locking and unlocking motor vehicles and other vehicles. With such an access system, in the simplest case the radio key transmits a signal, which is received and processed by a receiving point in or on the vehicle. The receiving point comprises an antenna for the reception of the signal transmitted by the transmission arrangement. In order to minimize transmission losses, it is advantageous if the polarization of the receiving antenna is adapted to the polarization of the antenna transmission arrangement.

BACKGROUND

Depending on the installation position of the receiving antenna, its orientation can be specified within more or less narrow limits by the features of the installation position. In many cases, e.g. if the receiving antenna is to be attached to the roof of a vehicle, it is advantageous to orientate the same so that it is optimized for a vertically or at least predominantly vertically polarized reception signal. The expression "vertical" is to be understood within the scope of the present invention as synonymous with "perpendicular to the surface of the Earth".

The electronics of transmission arrangements typically include a circuit board that is built into the key housing. Therefore it is advantageous to use a very flat housing for this purpose, so that the key has a flat design and is thus well suited to be stored, especially if it is carried on the body, e.g. in an item of clothing. Transmission arrangements with such a flat construction are normally held during the transmission operation so that the circuit board is approximately oriented parallel to the surface of the Earth.

SUMMARY

One embodiment provides a transmission arrangement for a radio station, especially for an access system, comprising: a circuit board with an upper main surface, as well as with a first metallization plane, in which conducting tracks are formed; control electronics for providing a frequency signal; an antenna structure comprising a coupling device, a conductor structure and a continuous, electrically conducting path having a first end and a second end opposite to the first end; wherein the coupling device is designed to couple a frequency signal provided by the control electronics into the conductor structure; the first end forms one end of the conductor structure and/or the second end forms one end of the conductor structure; one or both of the first end and of the second end is/are separated from the circuit board by a gas or an electrically non-conducting material.

In a further embodiment, the conductor structure comprises a vertical segment running perpendicular to the upper main surface and being disposed on a side of the conductor structure that is opposite to the first end and the second end.

In a further embodiment, the first end and the second end are opposite each other in a vertical direction given by the direction of the normal to the upper main surface.

In a further embodiment, the distance between the first end and the second end lies in the range of 0.1 mm to 10 mm.

In a further embodiment, the conductor structure is made in one piece.

In a further embodiment, the conductor structure comprises a first partial structure and a second partial structure.

In a further embodiment, the first end forms one end of the first partial structure and the second end forms one end of the second partial structure.

In a further embodiment, the first partial structure has a planar widening at the first end and/or the second partial structure has a planar widening at the second end.

In a further embodiment, the control electronics is coupled to the conductor structure in one of the following ways: inductively and galvanically isolated; capacitively and galvanically isolated; galvanically; inductively, capacitively and galvanically isolated; inductively and galvanically; inductively, capacitively and galvanically.

In a further embodiment, the circuit board comprises a second metallization plane parallel to the first metallization plane; a first conductor loop, which is connected to the control electronics, is formed in the first metallization plane; a second conductor loop, which is connected to the conductor structure and which forms a component of the electrically conducting path, is formed in the second metallization plane; and the first conductor loop is inductively coupled to the second conductor loop and hence the control electronics is inductively coupled to the conductor structure.

In a further embodiment, the conductor structure comprises a segment that is disposed parallel to the normal direction of the upper main surface neither above nor below the circuit board.

In a further embodiment, the conductor structure consists entirely or at least partly of a stamped and/or bent metal sheet.

In a further embodiment, the control electronics is designed to provide a frequency signal with a center frequency; the entire unit connected downstream of the control electronics, which comprises the coupling structure, the antenna structure and an optional connecting line for connecting the control electronics to the coupling structure, has a frequency bandwidth centered about the center frequency in a range in the KHz or MHz range.

In a further embodiment, the antenna structure has an impedance of 50 Ohms.

In a further embodiment, a radio station, e.g., an electronic vehicle key, includes a transmission arrangement as disclosed above.

BRIEF DESCRIPTION OF THE DRAWINGS

Example embodiments of the invention are discussed in detail below with reference to the accompanying figures, in which.

DETAILED DESCRIPTION

Embodiments of the present invention provide a transmission arrangement for an access system, which provides high transmission quality with low transmission losses under the conditions referred to.

Accordingly, some embodiment provide a transmission arrangement for a radio station, especially of an access system of a vehicle. The transmission arrangement comprises a circuit board with an upper main surface and a first metallization plane in which conducting tracks are formed. Moreover, control electronics for providing a frequency signal and an antenna structure are provided. The antenna structure comprises a coupling device, a conductor structure and a continuous electrically conducting path having a first end and a second end opposite the first end. The coupling device is designed to couple a frequency signal provided by the control electronics into the conductor structure. The first end and/or the second end form(s) one end of the conductor structure. Moreover, one or both of the first end and the second end is/are separated from the circuit board by a gas or an electrically non-conducting material.

Other embodiment provide a radio station, e.g., a portable radio station, e.g., in the form of an electronic vehicle key with a transmission arrangement, as has been explained above.

Figure 1:
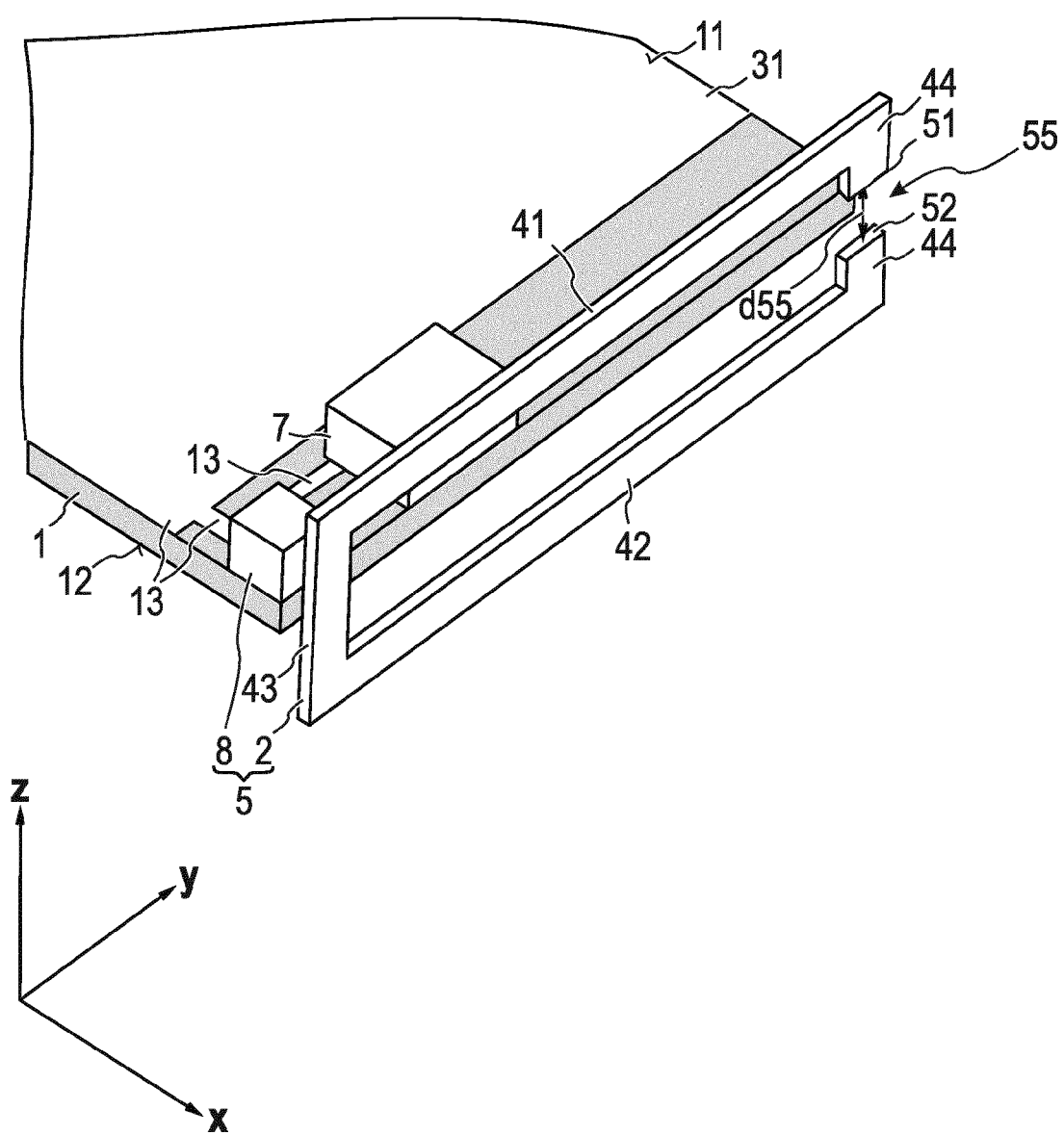
FIG. 1 shows a first example of a transmission arrangement with a conductor structure in the form of a ring with a gap.

FIG. 1 shows a perspective view of a transmission arrangement, such as can be used, e.g., in a portable radio station, in this case in an electronic key for a motor vehicle. The transmission arrangement comprises a circuit board 1 with an upper main surface 11 and a lower main surface 12. In this sense, the two main surfaces 11, 12 are provided by the two largest area sides of the circuit board 1.

The upper main surface 11 lies essentially in a plane spanned by the mutually perpendicular directions x and y. The direction z, which is referred to below as the "vertical direction", runs perpendicular to the x-y plane. The circuit board 1 comprises a first metallization plane 31, which by way of example is formed on the upper main surface 11, but which can also be disposed e.g. within the circuit board 1, e.g. in the case of a multilayer circuit board. The first metallization plane 31 is structured to form conducting tracks and/or conducting surfaces 13. Optionally, a second metallization plane can be provided on the lower main surface 12, but this is concealed in FIG. 1.

The transmission arrangement comprises an antenna structure 5 with a conductor structure 2. A continuous electrically conducting path of the antenna structure 5 is formed between a first end 51 of the antenna structure 5 and a second end 52 of the antenna structure 5. The first end 51 and the second end 52 are each separated from the circuit board 1 by a gas, e.g. air, or by an electrically non-conducting material. An electrically non-conducting material can be e.g. a casting compound or a dielectric material with a desired relative permittivity, in which the transmission arrangement is completely or partly embedded.

On the circuit board 1, in this case on its upper main surface 11, there are control electronics 7 and a coupling device 8. In a variation from this, the control electronics 7 and the coupling device 8 could also be disposed on the lower main surface 12 of the circuit board 1. Likewise, the control electronics 7 could be disposed on the upper main surface 11 and the coupling device 8 on the lower main surface 12, or—conversely—the coupling device 8 could be disposed on the upper main surface 11 and the control electronics 7 on the lower main surface 12. Equally, the control electronics 7 and the coupling device 8 can each comprise a plurality of elements, of which at least one is disposed on the upper main surface 11 and another on the lower main surface 12. The control electronics 7 and/or the coupling device 8 can also each be disposed completely separately or partly separately from the circuit board 1.

The conductor structure 2 is by way of example in the form of an essentially planar, flat punched sheet part. It has an annular structure that is interrupted by a gap 55. With the example according to FIG. 1, the conductor structure 2 comprises two horizontal segments 41, 42 disposed parallel to the first main surface 11 and parallel to each other. Moreover, the conductor structure 2 comprises two vertical segments 43, 44, wherein the gap 55 is located in the vertical segment 44. The first end 51 and the second end 52 are disposed opposite each other in the z-direction in this case. Moreover, the vertical segment 43 is joined at its ends to the vertical segment 44 by the horizontal segments 41 and 42.

During the operation of the transmission arrangement, the control electronics 7 produces a frequency signal with a center frequency that is fed to the conductor structure 2 via the coupling device 8. For this purpose, an output of the control electronics 7 at which the frequency signal is provided is connected to the coupling device 8 via a conducting track 13 that is formed in the first metallization plane 31. Alternatively or additionally, however, said connection can also be made wholly or partly with any other electrical connecting elements such as e.g. a bonding wire.

The coupling device 8 is only shown schematically in FIG. 8. In principle, the coupling between the control electronics 7 and the antenna structure 5 can be carried out in different ways using the coupling device 8. For example, the coupling can be implemented in one of the following ways: inductively and galvanically isolated; capacitively and galvanically isolated; galvanically; inductively and capacitively but galvanically isolated; inductively and galvanically; inductively, capacitively and galvanically. Depending on the type of coupling, for this purpose the coupling device 8 can comprise capacitor components or other capacitive structures, inductive elements or other inductive structures, as well as resistance elements or other electrical-resistive structures. "Elements" are understood here to be components with which the circuit board 1 is populated, e.g. by soldering or electrically conducting glue.

With the example according to FIG. 1, the coupling device 8 contains a winding, which is not shown in detail, which can comprise a plurality of turns, one turn or even only a partial turn. Said winding is arranged such that it is inductively coupled to the conductor structure 2. With other embodiments of the coupling, the coupling device 8 can alternatively or additionally be connected to the conductor structure 2 via a galvanic connection and/or a capacitance.

The frequency signal provided by the control electronics 7 during the operation of the transmission arrangement is coupled into the conductor structure 2 via the coupling device 8, whereby the antenna structure 5 radiates an electromagnetic signal whose electric field has a significant component in the z-direction.

The frequency signal provided by the control structure 7 has a center frequency. Moreover, the entire unit connected downstream of the control electronics 7, which comprises the coupling structure 8, the conductor structure 2 and an optionally provided connecting line for connecting the control electronics 7 to the coupling structure 8, has a frequency bandwidth. Said frequency bandwidth is centered about the center frequency, so that a signal radiated by the transmission arrangement can be received by a receiver in a useful form. The bandwidth has a magnitude of a pair of KHz or MHz about the center frequency.

In that the bandwidth is centered about the center frequency of the signal, the transmission arrangement is operated in the region of the resonance of the conductor structure 2, so that an appropriate current distribution is formed in the conductor structure 2. In this case the first end 51 and the second end 52 form node points at which the current is essentially equal to zero. The point of maximum amplitude of the alternating current is located in the vertical segment 43, however, which is disposed on the side of the conductor structure 2 opposite the gap 55. As a result the transmission arrangement thus produces an electromagnetic wave whose electromagnetic field has a significant component in the z-direction.

The natural resonance mentioned above can be adjusted by the design of the coupling device 8 for one thing, for another by the distance d55 between the first end 51 and the second end 52, i.e. by the width of the gap 55. The distance d55 can in principle be optionally selected and it can e.g. be in the range of 0.1 mm to 10 mm.

Figure 2:
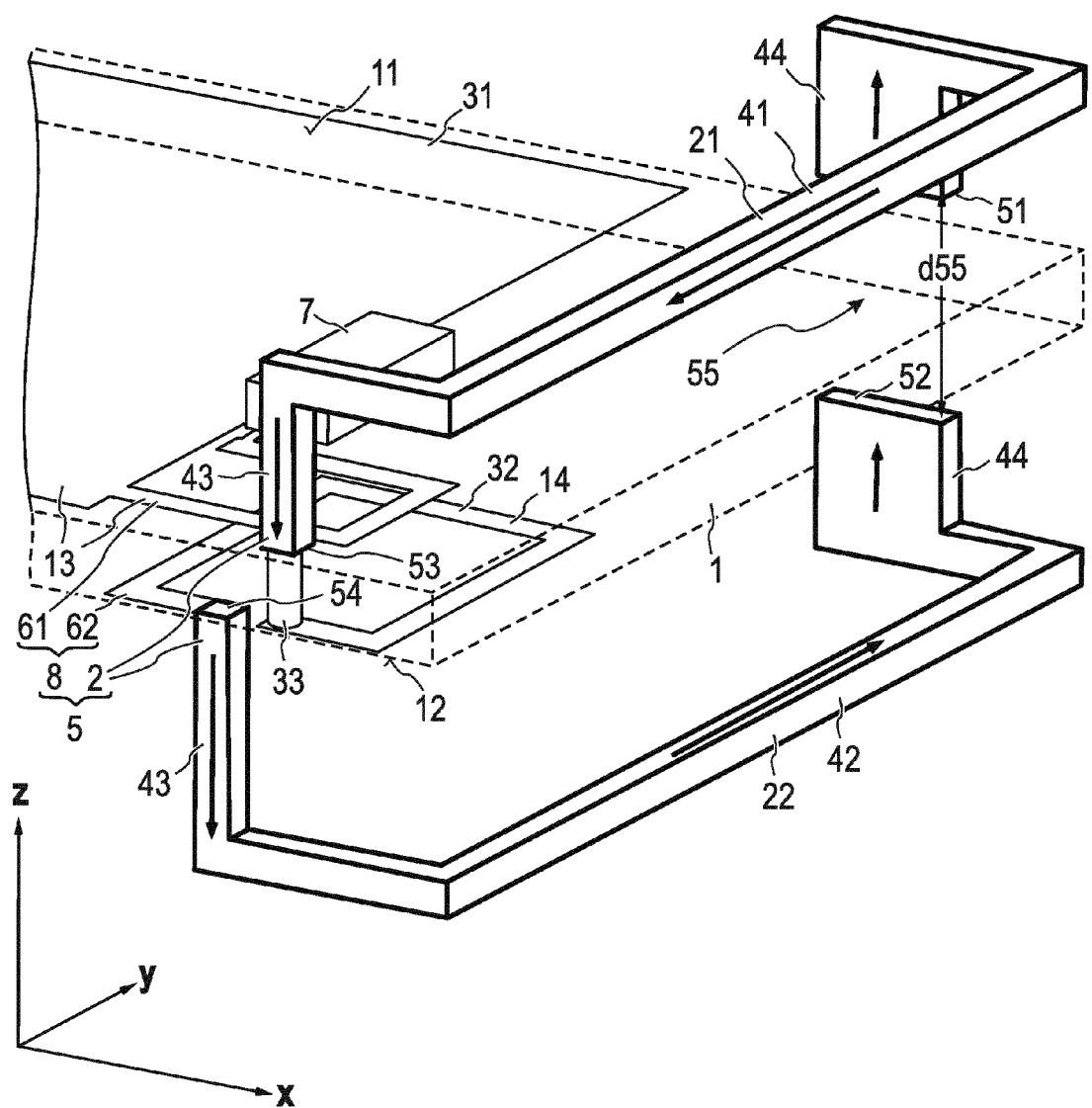
FIG. 2 shows a transmission arrangement with an antenna structure that comprises a two-part conductor structure, which is connected to a conductor loop of a circuit board, which in turn is inductively coupled to another conductor loop of the circuit board.

According to another example shown in FIG. 2 a circuit board 1 is also provided, which is provided on the upper main surface 11 with a first metallization plane 31, in which conducting tracks and/or conductor surfaces 13 are formed. A second metallization plane 32, which is also structured to form conducting tracks and/or conductor surfaces 14, is formed on the lower main surface 12 parallel to the first metallization plane 31.

A first conductor loop 61, which is connected to the control electronics 7, is formed in the first metallization plane 31. Moreover, a second conductor loop 62, which is connected in series with the conductor structure 2 and which represents a component of the electrically conducting path, is formed in the second metallization plane 32. Unlike the arrangement according to FIG. 1, the conductor structure 2 is divided and comprises at least one first partial structure 21 and one second partial structure 22. The first end 51 forms one end of the first partial structure 21, the second end 52 forms one end of the second partial structure 22. The first partial structure 21 comprises moreover a further end 53, which forms an end of the first partial structure 21 opposite the first end 51. Accordingly, the second partial structure 22 also comprises a further end 54, which forms an end of the second partial structure 22 opposite the second end 52. The second conductor loop 62 is now connected between the two further ends 53 and 54 in series with the two partial structures 21, 22, so that it lies in the current path between the first end 51 and the second end 52.

Because the further end 54 is on the same side of the circuit board 1 as the second metallization plane 32, but on the other hand the further end 53 is on the opposite side of the circuit board 1, a through-contact 33 is provided in the circuit board 1 that electrically connects the further end 53 to the second conductor loop 62.

Alternatively to the embodiment shown in FIG. 2, one of the partial structures 21, 22 can also be implemented as a conducting track of the circuit board 1.

As is also shown in FIG. 2, a longitudinal section 41, 42—in relation to the vertical segments 43, 44—can be folded away from the circuit board 1.

The first conductor loop 61 is inductively coupled to the second conductor loop 62 for the transmission of a frequency signal provided by the control electronics 7. For this purpose, for the example according to FIG. 2 the frequency signal provided by the control electronics 7 is fed to the first conductor loop 61 and is inductively coupled by the same into the second conductor loop 62. For this purpose the first conductor loop 61 is disposed above the second conductor loop 62 in the z-direction, so that the first conductor loop 61 and the second conductor loop 62 overlap fully or at least partly. With increasing overlap the strength of the inductive coupling also increases. Because the strength of the coupling has a significant influence on the resonant frequency of the antenna structure 5, a desired resonant frequency and the impedance can be adjusted by means of the degree of coupling, i.e. by means of the degree of the overlap between the first conductor loop 61 and the second conductor loop 62.

Another adjustment of the resonant frequency of the antenna structure 5 can be carried out by means of the width d55 of the gap 55. Alternatively or additionally, an adjustment can also be carried out by a planar widening of the conductor structure 2 at its first end 51 and/or by a planar widening of the conductor structure 2 at its second end 52. The capacitance between the ends 51 and 52 of the conductor structure 2 is increased by the widening, which accordingly influences the natural resonant frequency of the antenna structure 5.

With a suitable configuration of the circuit board 1, e.g. in the case of a multilayer circuit board, instead of only a single first conductor loop 61, a first coil could be provided that is formed of a plurality of conductor loops connected in series, of which each is formed in a different metallization plane of the circuit board 1. The individual conductor loops of the coil would then be disposed above each other in the z-direction and e.g. connected in series by through-contacts of the circuit board, so that the first coil comprises two or more conductor loops connected in series.

Accordingly, instead of only a single second conductor loop 62, a second coil could also be provided that is formed of a plurality of conductor loops connected in series, of which each is formed in a different metallization plane of the circuit board 1. The individual conductor loops of the coil would then be disposed above each other in the z-direction and connected in series e.g. using through-contacts of the circuit board 1, so that the second coil comprises two or more conductor loops connected in series.

However, the position of maximum amplitude of the alternating current is located in the vertical segment 43, which is disposed on the side of the conductor structure 2 opposite the gap 55. As a result the transmission arrangement thus produces an electromagnetic wave whose electromagnetic field comprises a significant component in the z-direction.

Unlike with the arrangement according to FIG. 1, the vertical segment 43—in relation to the length of the current path formed between the first end 51 and the second end 52—is not in the middle of the current path, but is still sufficiently close to the middle so that the electric field of the electromagnetic wave radiated by the antenna structure 5 nevertheless has an adequate amplitude in the z-direction.

The electric field of the electromagnetic wave radiated during operation of the transmission arrangement according to FIG. 2 also comprises a component perpendicular to the z-direction because of the second conductor loop 62 disposed parallel to the upper main surface 11, so that operation of the transmission arrangement is also guaranteed if this is oriented other than as provided. Because the ratio of the amplitude of the electric field in the z-direction to the amplitude of the electric field perpendicular to the z-direction is determined by the geometry of the second conductor loop 62 and of the conductor structure 2 in particular, a desired ratio can be adjusted by an adjustment of the geometry.

With this adjustment option it can be achieved that the electromagnetic wave radiated by the antenna structure 5 is predominantly polarized in the z-direction, i.e., that the electric field of the wave has a larger amplitude perpendicular to the circuit board than in any direction parallel to the upper main surface 11.

A vertical segment 43 of the conductor structure 2 extending perpendicular to the upper main surface 11—as shown by way of example in FIGS. 1 and 2—can be disposed on a side of the conductor structure 2 opposite the first end 51 and the second end 52.

Furthermore, the conductor structure 2 can comprise one or a plurality of segments disposed outside of the lateral edge of the circuit board 1, i.e. which is neither above nor below the circuit board 1 parallel to the z-direction. With the arrangements according to FIGS. 1 and 2, these are e.g. the horizontal segments 41 and 42. This can save space on the circuit board 1 that is available for the introduction of other components. In order to ensure the mechanical stability of the arrangement, the conductor structure 2 can optionally be supported and/or mounted at one or a plurality of points, e.g. with respect to the circuit board 1, using a dielectric material. This increases the mechanical stability of the transmission arrangement on the one hand, on the other this can prevent oscillations of the free arms of the conductor structure 2, which are connected to the vertical segment 43. This is of particular importance because otherwise there is a risk that the distance d55 between the ends 51 and 52 changes because of the oscillations and thus consequently the resonant frequency of the antenna structure 5 changes.

In principle, the horizontal segments 41 and 42 can, as shown in FIGS. 1 and 2, be disposed one above the other in the z-direction. However, this is not absolutely necessary.

The manufacture of a conductor structure 2 can, irrespective of whether it is made in one piece or comprises two or more partial structures 21, 22, be carried out particularly simply by stamping and/or bending a metal sheet. In principle, however, a conductor structure 2 can also be manufactured in any other way, such as e.g. by milling or casting.

The length of the electrically conducting path from the first end 51 to the second end 52 corresponds to half the effective wavelength $\lambda_{eff}$ that results from the relative permittivities of the materials used in the transmission arrangement, the entire geometry of the antennas and the components of the transmission arrangement at the center frequency $f_0$ of the frequency signal provided by the control electronics 7.

Optionally, an antenna structure 5 used with the present invention can be designed to have an impedance of 50 Ohms.

Another advantage of the transmission arrangement according to the invention is that it can be designed as symmetrical and self-resonant, so that the ground plane is not part of the radiating system and interference effects through contact (excluding the front region of the antenna) of the transmission arrangement with the hand are less pronounced than with conventional systems.

With a transmission arrangement as previously described, in particular an electronic vehicle key can be manufactured. In principle, however, radio keys/transponders for any applications can be implemented with such a transmission arrangement.

Finally, it is noted that various features of the preceding exemplary embodiments can be combined with each other in any way as long as the features of such a combination are not mutually exclusive.

REFERENCE CHARACTER LIST 1 circuit board
2 conductor structure
5 antenna structure
7 control electronics
8 coupling device
9 first conductor loop
10 second conductor loop
11 upper main surface
12 lower main surface
13 conducting track
14 conducting track
31 first metallization plane
32 second metallization plane
33 through-contact
21 first partial structure
22 second partial structure
41 horizontal segment
42 horizontal segment
43 vertical segment
44 vertical segment
51 first end
52 second end
53 end
54 end
55 gap
61 conductor loop
62 conductor loop
z vertical direction

What is claimed is:

1. A transmission arrangement for a radio station of an access system, the transmission arrangement comprising:
a circuit board having an upper main surface, and a first metallization plane in which conducting tracks are formed;
control electronics configured to provide a frequency signal;
an antenna structure comprising a coupling device, a conductor structure, and a continuous, electrically conducting path extending from the coupling device having a first end and a second end opposite the first end, both the first end and the second end remote from the coupling device;
wherein the coupling device is configured to couple a frequency signal provided by the control electronics to the conductor structure;
wherein the electrically conducting path comprises a generally rectangular cross-section normal to the path as it extends from the coupling device to the first end and to the second end and at least one of the first and second ends of the electrically conducting path includes a section of the electrically conducting path with an increased rectangular cross section that forms an end of the conductor structure; and
wherein at least one of the first and second ends of the electrically conducting path is separated from the circuit board by a gas or an electrically non-conducting material.

2. The transmission arrangement of claim 1, wherein the conductor structure comprises a vertical segment extending perpendicular to the upper main surface of the circuit board and disposed on a side of the conductor structure opposite the first end and the second end of the electrically conducting path.

3. The transmission arrangement of claim 1, wherein the first and second ends of the electrically conducting path are opposite each other in a vertical direction normal to the upper main surface.

4. The transmission arrangement of claim 1, wherein a distance between the first end and the second end lies in the range of 0.1 mm to 10 mm.

5. The transmission arrangement of claim 1, wherein the conductor structure is formed as a unitary piece.

6. The transmission arrangement of claim 1, wherein the conductor structure comprises a first partial structure and a second partial structure.

7. The transmission arrangement of claim 6, wherein the first end of the electrically conducting path forms one end of the first partial structure, and the second end of the electrically conducting path forms one end of the second partial structure.

8. The transmission arrangement of claim 6, wherein the control electronics is coupled to the conductor structure in one of the following manners: inductively and galvanically isolated; capacitively and galvanically isolated; galvanically; inductively, capacitively and galvanically isolated; inductively and galvanically; and inductively, capacitively and galvanically.

9. The transmission arrangement of claim 8, wherein:
the circuit board comprises a second metallization plane parallel to the first metallization plane;
a first conductor loop, which is connected to the control electronics, is formed in the first metallization plane;
a second conductor loop, which is connected to the conductor structure and which forms a component of the electrically conducting path, is formed in the second metallization plane; and
the first conductor loop is inductively coupled to the second conductor loop, thereby inductively coupling the control electronics to the conductor structure.

10. The transmission arrangement of claim 1, wherein the conductor structure comprises a segment extending parallel to the normal direction of the upper main surface neither above nor below the circuit board.

11. The transmission arrangement of claim 1, wherein the conductor structure at least one of a stamped metal sheet and a bent metal sheet.

12. The transmission arrangement of claim 1, wherein the control electronics is configured to provide a frequency signal with a center frequency; and
wherein the coupling device, the antenna structure, and an optional connecting line for connecting the control electronics to the coupling device form components of a unit connected downstream of the control electronics, which has a frequency bandwidth centered about the center frequency in a KHz or MHz range.

13. The transmission arrangement of claim 1, wherein the antenna structure has an impedance of 50 Ohms.

14. An electronic vehicle key, comprising:
a transmission arrangement comprising:
a circuit board having an upper main surface, and a first metallization plane in which conducting tracks are formed;
control electronics configured to provide a frequency signal;
an antenna structure comprising a coupling device, a conductor structure, and a continuous, electrically conducting path extending from the coupling device and having a first end and a second end opposite the first end, both the first end and the second end remote from the coupling device;
wherein the coupling device is configured to couple a frequency signal provided by the control electronics to the conductor structure;
wherein the electrically conducting path comprises a generally rectangular cross-section normal to the path as it extends from the coupling device to the first end and to the second end and at least one of the first and second ends of the electrically conducting path includes a section of the electrically conducting path with increased rectangular cross-section that forms an end of the conductor structure; and
wherein at least one of the first and second ends of the electrically conducting path is separated from the circuit board by a gas or an electrically non-conducting material.

15. The electronic vehicle key of claim 14, wherein the conductor structure comprises a vertical segment extending perpendicular to the upper main surface of the circuit board and disposed on a side of the conductor structure opposite the first end and the second end of the electrically conducting path.

16. The electronic vehicle key of claim 14, wherein the first and second ends of the electrically conducting path are opposite each other in a vertical direction normal to the upper main surface.

17. The electronic vehicle key of claim 14, wherein:
the conductor structure comprises a first partial structure and a second partial structure,
the first end of the electrically conducting path forms one end of the first partial structure, and
the second end of the electrically conducting path forms one end of the second partial structure.

18. The electronic vehicle key of claim 14, wherein:
the circuit board comprises a second metallization plane parallel to the first metallization plane;
a first conductor loop, which is connected to the control electronics, is formed in the first metallization plane;
a second conductor loop, which is connected to the conductor structure and which forms a component of the electrically conducting path, is formed in the second metallization plane; and
the first conductor loop is inductively coupled to the second conductor loop, thereby inductively coupling the control electronics to the conductor structure.

* * * * *